Figure 1:
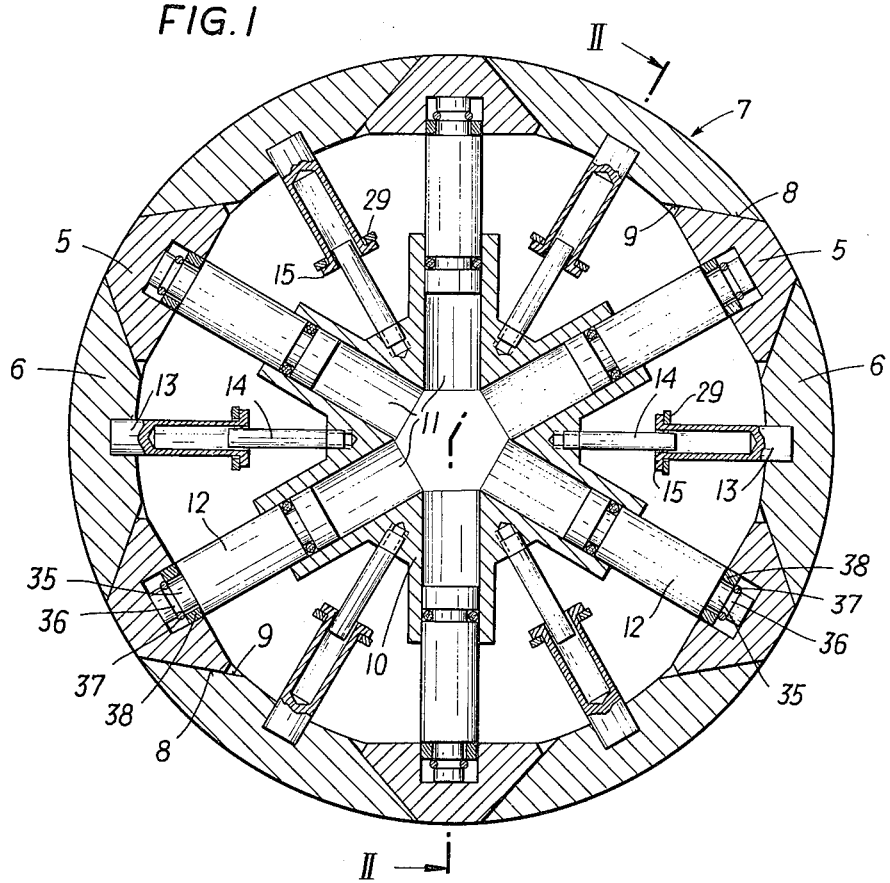

United States Patent [19]
Schmitzberger

[11] 3,989,439
[45] Nov. 2, 1976

[54] DEVICE FOR FORMING TUBE SOCKETS

[75] Inventor: Franz Schmitzberger, Getzersdorf, Austria

[73] Assignee: Inteco Establishment, Vaduz, Liechtenstein

[22] Filed: Oct. 30, 1974

[21] Appl. No.: 519,255

[30] Foreign Application Priority Data
Nov. 23, 1973 Austria .................... 9847/73

[52] U.S. Cl. ............... 425/392; 264/296; 425/403; 425/457; 425/DIG. 14; 425/DIG. 218
[51] Int. Cl.² ........................ B29C 17/00
[58] Field of Search ........... 425/392, 393, DIG. 218, 425/438, 384, 383, DIG. 211, DIG. 14, DIG. 58, 457, 403; 249/178, 180, 181, 63, 66, 152, 184, 157; 264/296, 222, 334; 25/128 K, 128 R, 128 RR, 128.1 RE

[56] References Cited
UNITED STATES PATENTS

| | | | |
|---|---|---|---|
| 2,405,254 | 8/1946 | Hopkins | 249/180 |
| 3,339,242 | 9/1967 | Lamb | 425/468 |
| 3,476,351 | 11/1969 | Burdett | 249/181 |
| 3,732,054 | 5/1973 | Lyng | 425/393 |
| 3,749,352 | 7/1973 | Khodosh et al. | 249/178 |
| 3,877,282 | 4/1975 | Pogonowski | 72/393 |

*Primary Examiner*—Francis S. Husar
*Assistant Examiner*—R. J. Charvat
*Attorney, Agent, or Firm*—Strauch, Nolan, Neale, Nies & Kurz

[57] ABSTRACT

A device for forming a tube of plastic material with a socket having an annular corrugation has a tube supporting core and a plurality of radially movable segments provided adjacently with contacting wedge surfaces, the segments in outwardly shifted position defining a circumferentially beaded portion for forming the annular corrugation on the supported tube.

10 Claims, 3 Drawing Figures

DEVICE FOR FORMING TUBE SOCKETS

The present invention refers to a device for forming sockets with an annular corrugation on tubes made from plastics material. Such a device comprises a core or triblet whose configuration corresponds with the cylindrically expanded socket to be formed, and a circumferentially beaded portion which is composed of radially movable segments and the configuration of which corresponds with said annular corrugation to be produced in said sockets.

In a known device of the kind a portion of the segments can be pivoted towards the centre along a circle line approximately in a radial direction. Other segments are pivotally linked at a part axially displaceable with respect to the core. These segments turn inwards upon an outward movement of said displaceable part. Thus the segments can be withdrawn from the formed socket. Such a device needs a relatively complicated construction. Since some of the segments with their supporting portions are movable axially away from the core, the latter is not complete until the segments are brought into their bead-forming position. Hence the tube cannot be shifted over the core before tthe segments are moved into their outwardly pivoted operating position. As a consequence, the tube is expanded to the largest diameter of the bead during shifting on the core. This is disadvantageous since the socket usually shall be retracted in diameter behind said corrugation.

In another known device the segments are wedge-shaped, the delimitation of said segments extending radially with respect to the axis of the device, seen in a cross-section perpendicular to said axis. In order to reduce the outer diameter the segments, whose wedge-shaped surfaces are contacting one another, must be displaced following an acute angle with respect to the axis of the device, every two adjacent segments being moved in axially different directions. This necessitates an intricate shaping of the segments and a complicate driving mechanism for moving the same. The invention refers particularly to a device in which the segments are wedge-shaped and the wedge surfaces contact one another. The scope of the invention is to improve a device of this type, and is characterized in that all segments are guided radially in a direction perpendicular with respect to the axis of the device, and that between every two segments ending in outwardly converging wedge surfaces other segments are provided, said latter segments ending in outwardly diverging wedge surfaces, and that the wedge surfaces of two adjacent segments are guided against one another along their whole radial travel, the outwardly extended position of the whole of the segments being delimited by shoulder faces co-operating with said segments.

In that way a simple construction is achieved. Since the segments are guided exclusively in a radial direction, the surface of the core is interrupted only in the region of the segments. Hence it is possible to shift the plastics tube over the core while the segments are in an inwardly retracted position and to extend said segments subsequently into their bead-forming position. Thus widening the socket at its end portion destined to be smaller in diameter is avoided. Shifting the heated tube end over the core with the segments retracted needs less force. Above all the tube end which after the forming process is to become the reduced socket end, fits tightly around the core, and must be held in this position only whilst the segments are extended outwardly to form the annular corrugation. Radial movement of the segments is possible as the wedge surfaces of adjacent segments converge in different directions. When moving inwardly the segments having outwardly converging surfaces are in advance, when moving outwardly they follow retardedly. By this configuration a tight contact between the segments in their external bead-forming position is assured.

In an embodiment of the invention it is advantageously provided that only every second segment is driven and the interposed segments are resiliently biased against said driven segments. In this connection it may be foreseen that the segments ending in outwardly converging wedge surfaces are driven. When being moved in an outward direction, these segments urge said interposed segments which have outwardly diverging surfaces also in the outward direction to define the bead-forming configuration. When the segments provided with outwardly converging surfaces return to their retracted position they are followed by the interposed outwardly diverging segments, the latter being biased by the action of springs. To obtain this effect it is useful that in the outwardly extended position of said segments their wedge surfaces are inclined by an angle of 20° to 70° with respect to the tangent drawn on the circle defined by the external circumference of said segments.

According to an embodiment of the invention the driven segments are connected, preferably with clearance, to the pistons of a hydraulic or pneumatic system. Thus the radial guidance of the driven segments is ensured by the cylinders or, respectively, the pistons. In this case, said hydraulic or pneumatic system consists in a unit comprising radially arranged cylinders, said pistons being guided within said cylinders and connected with said driven segments. Furthermore, the core is axially divided into two parts which are joined together, said unit with radially arranged cylinders being interposed between them. This may be usefully achieved by providing said unit with axially projecting parts extending perpendicularly to the cylinder axes and having exterior threads, whereby said two parts of said core are clamped together by means of said projecting parts.

In order to define stops for limiting the extreme position of the segments the edge portions of said segments are conically shaped and are overlapped in the extended position of said segments by concavely conical border portions of said core. Thus the segments are precisely centered in their operational position without any necessity of guiding precisely the segments on their radial travel.

An embodiment of the device according to the invention is illustrated by way of example on the schematic drawings.

Figure 3:
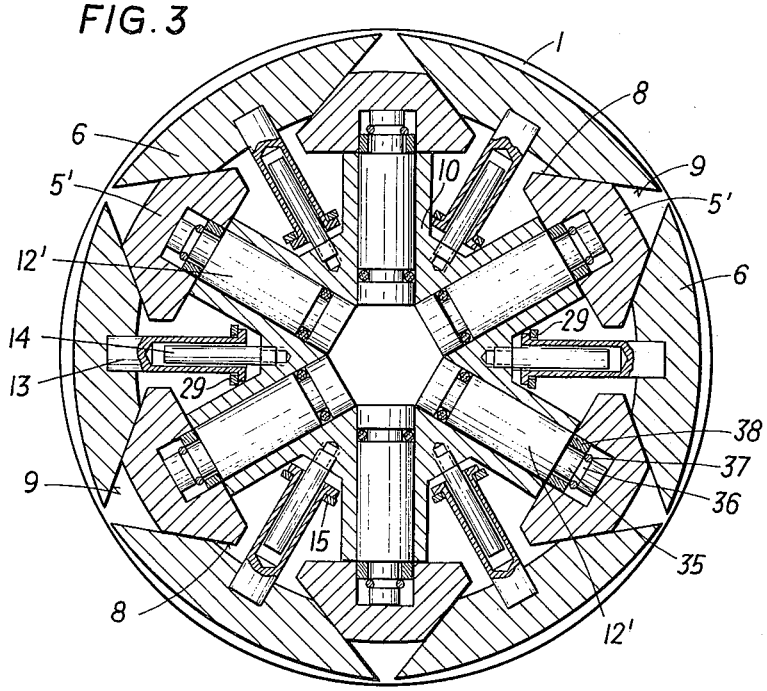
Figure 2:
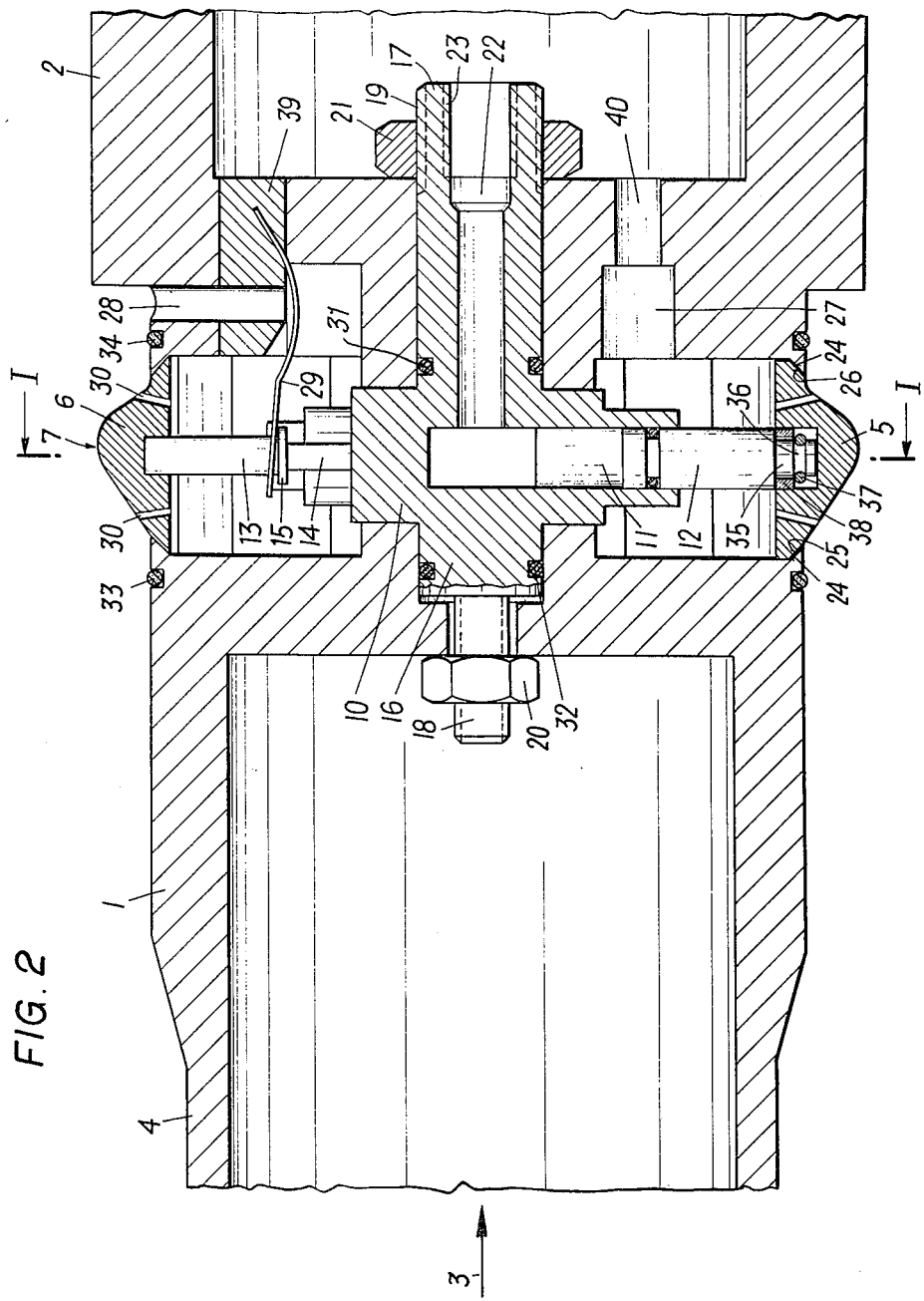

FIGS. 1 and 2 show a core with the segments moved outwardly into the operational position, FIG. 1 being a transverse cross-section along the line I — I of FIG. 2, and FIG. 2 being a longitudinal section following the line II — II — II of FIG. 1. FIG. 3 is a cross-section similar to FIG. 1 with the segments being inwardly retracted.

The tube end to be formed is shifted over a core or triblet 1, 2 in the direction designated by the arrow 3. The portion 4 of said core has a diameter corresponding with the inner diameter of the tube. By shifting onto said core the tube diameter is expanded to the size of the outer diameter of said portion 1. The tube on which a socket end is to be formed consists - as known per se - of a material workable in a thermoplastic condition such as polyethylene, polypropylene, polyacrylic nitrile-butadiene-styrene (ABS) or polyvinyl chloride, and the tube end is to be heated before shifting on said core as it is known in the art.

The segments 5 and 6, when in a position outwardly moved as shown in FIG. 1 and 2, define an annular beading or reinforcement 7 which is to form the corrugation of the socket. The segments 5 have wedge-shaped and outwardly converging end surfaces 8. The end surfaces 9 of the segments 6 are wedge-shaped too but converge inwardly. The wedge angle between the surfaces 8 or, respectively, 9 depends on the tube diameter and, in consequence, on the size of the device. With an external tube diameter of, say, 10 in (250 mm) the inclination of said surfaces may be 30° or, respectively, 60°, with 4½ in (110 mm) diameter, 42° or, respectively, 48°.

10 is a unit comprising six radially arranged cylinders 11, each of them receiving a piston 12 on which is secured on segment 5. Said segments 5 are mounted on the pistons 12 with radial play to compensate manufacturing tolerances and to ensure proper contact of said segments in their extended position. The pistons 12 are provided with a shoulder on their end 35 where a spring ring 37 is inserted into an annular groove 36. The end portion 35 is surrounded by a sleeve 38 with radial play, said sleeve being glued into said segment 5 after said ring 37 is caught within said groove 36.

The segments 5 and 6 have tapered edges 24 overlapped by concave conical end portions 25 and 26 of the core parts 1 and 2. This will exactly define the extended position of the segments 5 and 6 which are guided with clearance.

The segments 6 are secured to bolts 13. Bolts 13 are provided with an axial bore receiving a guide pin 14 threaded onto the unit 10. Also this guide connection may be provided with a radial clearance in order to compensate any manufacturing inexactness. The outwardly diverging surfaces 9 of the segments 6 are maintained in an even and close contact with the outwardly converging surfaces 8 of the segments 5 by means of leaf springs 29 which engage the bolts 13 urging them to the centre of the unit 10. Said leaf springs 29 being inserted in retaining parts 39 are acting against a collar 15 provided on the bolts 13. Parts 39 are fixed in their position by means of pins 28. It is not strictly necessary that the bolts 13 be guided by pins 14 since the segments 6 are self-centering owing to their inclined surfaces 8, 9 and owing to the overlapping edges 25, 26 of the core 1, 2. The leaf spring 29 in itself will be sufficient to hold the bolt 13.

The geometrical axis of the unit 10 coincides with the axis of the core 1, 2. The unit 10 is provided with axially projecting parts 16, 17, extending perpendicularly to the cylinder axes 11. The part 16 has a threaded stud 18, and the part 17 comprises a threaded end 19. The two parts 1 and 2 of the core are joined together with the interposed unit 10. They are clamped together by nuts 20 and 21 screwed onto the stud 18 and the threaded end 19 of the unit 10. The projecting part 17 is hollow, its bore 22 being provided with a female thread 23 connectable to a pressure fluid conduit.

The action of the leaf spring 29 may be aided either by vacuum or by compressed air. If vacuum is applied e.g. the bore 22, adapted for supplying compressed air to the cylinders 11, may be connected with a vacuum conduit so that the pistons 12 are pulled radially to the centre taking with them the segments 5. If compressed air is used such air may be introduced between the outer surfaces of the segments 5 and 6 on the one hand and the socket to be formed by these segments on the other hand whereby said segments are pressed in the inward direction. If so, compressed air may be supplied e.g. through an inlet 40 into a chamber 27 from where the air penetrates through conduits 30 into the gap between the segments and the socket.

When retracted the segments take the position 5', 6', as shown in FIG. 3. There they do not project from the core 1, 2. By introducing compressed air through the bore 22 the pistons are moved from their position 12' outwards to the position shown in FIG. 1 whereby the segments 5 are moved in the same direction. By the effect of the inclined surfaces 8, 9 the segments 6 are displaced from the position 6' until they reach the position shown in FIG. 1 and 2. In such extended position as shown in FIG. 1 said segments 5, 6 define an annular substantially circumferentially continuous beading or reinforcement 7 which forms the corrugation on the socket.

With said segments 5, 6 retracted as in FIG. 3 the heated tube end is shifted over the core 1, 2, and then said segments are extended from the position 5', 6' to the outer position 5, 6 as in FIGS. 1, 2. In this case, vacuum force will be sufficient to press the contracted socket end formed by part 2 against the core. Thus e.g. the chamber 27 may be connected to a vacuum conduit whereby the suction effect is transmitted via said conduits 30 to the tube portion surrounding the reinforcement 7. Sealing rings, 31, 32 are provided for the inner tightness and outer sealing rings 33, 34 are foreseen to seal the tube against the core. In this connection, it is advantageous that a suction effect may be exerted also through gaps possibly existing between the inclined surfaces 24 and 25 or 26, respectively, or between the segments 5 and 6 to press the tube wall against the annular reinforcement. Of course, also an outer mould could be applied. An outer mould or use of vacuum is not necessary but could be provided in exceptional circumstances, i.e. if a very intricate corrugation size is desired or if tube walls of a particular thickness are to be deformed.

Furthermore, the tube end may be shifted over the core 1, 2 also with extended segments 5, 6 and over these segments, since the tube will recollapse after having passed said segments, and may be pressed if desired by an outer mould against the annular reinforcement 7. To remove the finished formed socket the segments 5, 6 must be retracted at all events to the positions 5', 6'.

What I claim is:

1. A device for forming sockets with annular corrugations or recesses on tubes of plastic material comprising a core having a longitudinal axis and a peripheral surface over which a tube to be formed is fitted, a plurality of segments circumferentially arranged around the core at said surface and including a first set wherein the segments end oppositely in outwardly converging wedge surfaces and a second set wherein the segments end oppositely in outwardly diverging wedge surfaces, the segments of said first and second sets being alternately arranged with adjacent wedge surfaces of the same inclination and in sliding contact, spring means acting on the segments of said second set biasing said adjacent wedge surfaces into contact, means mounting each of said segments for slidable displacement substantially radially of the core in a plane perpendicular to the core axis, fluid motor means driving the segments of said first set between an inner retracted position and an outer extended position at said peripheral surface, the segments of said second set being displaced against the force of said spring means by outward movement of the segments of said first set to an outer extended position in circumferentially continuous relation with the extended segments of said first set, said spring means being energized by outward movement of said second set of segments, rim means at said peripheral surface for uniformly limiting outward movement of said segments, and said segments being shaped at their outer faces to define in said outwardly extended limited positions a substantially continuous annular bead at said surface adapted to form the corrugation or recess in said tube, said first set of segments being driven inwardly to retracted position by said motor means, and said energized spring means driving said second set of segments to inner retracted position as the first set of segments is retracted.

2. A device according to claim 1, characterized in that said core is divided axially into two parts which are joined together, said segments being disposed between said core parts, said rim means comprising inwardly tapered circumferential lips on ends of said core parts facing one another, said outer surfaces of said segments including tapered peripheral edge portions in mating contact with said circumferential lips in said outward extended bead defining position of said segments.

3. A device according to claim 1, wherein each segment of said second set is mounted on a tubular member slidably telescoped upon a fixed internal radial projection, and said spring means comprises individual springs acting on each segment of said second set.

4. A device according to claim 1, wherein said fluid motor means comprises a plurality of radially arranged cylinders open at their inner ends to a common pressure chamber, and a piston is slidably mounted in each cylinder with its outer end fixed to a segment of said first set.

5. A device according to claim 1, characterized in that in said outward extended position of said segments their wedge surfaces are inclined in an angle of from 20° to 70° with respect to a tangent drawn on a circle defined by the external circumference of said extended segments.

6. A device according to claim 1, wherein said fluid motor means comprises an individual piston cylinder fluid motor for each of said driven first set of segments, said first set of driven segments being connected to the pistons of their respective piston cylinder fluid motors.

7. A device according to claim 6, characterized in that said fluid motor drive means comprises a unit having radially arranged cylinders, and said pistons are slidably guided within said cylinders.

8. A device according to claim 7, characterized in that said core is divided axially into two parts which are joined together, said unit with its radially arranged cylinders being interposed between said two core parts.

9. A device according to claim 8, characterized in that said unit comprising radially arranged cylinders is provided with axially projecting means extending coincident with the core parts axes for joining said two core parts together.

10. A device according to claim 9, characterized in that one of said axially projecting means of said unit is hollow and further serves as a fluid pressure conduit connected to said cylinders.

* * * * *